(12) United States Patent
Zhao et al.

(10) Patent No.: US 10,745,281 B1
(45) Date of Patent: Aug. 18, 2020

(54) COMPOSITION FOR MULTI-COMPONENT COMPOSITE INTERCALATION, METHOD OF PREPARING A LOW-TEMPERATURE EXPANDABLE GRAPHITE SYSTEM AND METHOD OF PROFILE CONTROL AND WATER SHUTOFF IN DEEP OIL RESERVOIR

(71) Applicants: China University of Petroleum (East China), Qingdao (CN); China University of Geosciences (Beijing), Beijing (CN); Northwest Oilfield Branch, China Petroleum & Chemical Co., Ltd, Urumqi (CN)

(72) Inventors: Guang Zhao, Qingdao (CN); Caili Dai, Qingdao (CN); Yahui Lv, Qingdao (CN); Jiawei Liu, Qingdao (CN); Sen Wang, Qingdao (CN); Ning Sun, Qingdao (CN); Qing You, Beijing (CN); Guangjie Hu, Urumqi (CN); Long He, Urumqi (CN); Liang Li, Urumqi (CN)

(73) Assignees: China University of Petroleum (East China), Qingdao (CN); China University of Geosciences (Beijing), Beijing (CN); Northwest Oilfield Branch, China Petroleum & Chemical Co., Ltd., Urumqi (CN)

( * ) Notice: Subject to any disclaimer, the term of this patent is extended or adjusted under 35 U.S.C. 154(b) by 0 days.

(21) Appl. No.: 16/799,255

(22) Filed: Feb. 24, 2020

(30) Foreign Application Priority Data

Jan. 14, 2020 (CN) .......................... 2020 1 0037482

(51) Int. Cl.
*C01B 32/225* (2017.01)
*C09K 8/42* (2006.01)
*C01B 32/23* (2017.01)

(52) U.S. Cl.
CPC ............ *C01B 32/225* (2017.08); *C01B 32/23* (2017.08); *C09K 8/426* (2013.01); *C01P 2004/61* (2013.01)

(58) Field of Classification Search
None
See application file for complete search history.

(56) References Cited

U.S. PATENT DOCUMENTS

| | | | | |
|---|---|---|---|---|
| 4,676,316 A | * | 6/1987 | Mitchell ................ | C09K 8/594 166/403 |
| 10,266,753 B1 | * | 4/2019 | Zhao ...................... | C09K 8/594 |
| 10,414,969 B2 | * | 9/2019 | Zhao ...................... | C09K 8/5045 |
| 2011/0059871 A1 | * | 3/2011 | Tour ....................... | B82Y 30/00 507/137 |
| 2012/0312102 A1 | * | 12/2012 | Alvarez ............... | F16J 15/3296 73/862.041 |
| 2012/0322694 A1 | * | 12/2012 | Monteiro .............. | C09K 8/032 507/105 |

(Continued)

FOREIGN PATENT DOCUMENTS

| CN | 103232839 A | 8/2013 |
|---|---|---|
| CN | 104927825B A | 9/2015 |

*Primary Examiner* — John J Figueroa
(74) *Attorney, Agent, or Firm* — Volpe and Koenig, P.C.

(57) ABSTRACT

The present disclosure relates to the field of oilfield chemistry, in particular to a composition for multi-component composite intercalation, a method of preparing a graphite system and a method of profile control and water shutoff.

20 Claims, 1 Drawing Sheet

(56) References Cited

U.S. PATENT DOCUMENTS

| | | | |
|---|---|---|---|
| 2013/0261030 A1* | 10/2013 | Monteiro | C09K 8/032 507/105 |
| 2013/0264121 A1* | 10/2013 | Young | C09K 8/035 175/65 |
| 2014/0120276 A1* | 5/2014 | De Wolf | C23F 11/144 428/34.1 |
| 2015/0080271 A1* | 3/2015 | De Wolf | C09K 8/94 507/202 |
| 2015/0368539 A1* | 12/2015 | Tour | G01V 3/24 340/854.3 |
| 2016/0115372 A1* | 4/2016 | Chakraborty | E21B 43/24 166/303 |
| 2018/0037808 A1* | 2/2018 | Chakraborty | E21B 43/24 |

* cited by examiner

COMPOSITION FOR MULTI-COMPONENT COMPOSITE INTERCALATION, METHOD OF PREPARING A LOW-TEMPERATURE EXPANDABLE GRAPHITE SYSTEM AND METHOD OF PROFILE CONTROL AND WATER SHUTOFF IN DEEP OIL RESERVOIR

PRIORITY CLAIM & CROSS REFERENCE

This application claims priority to Chinese Application No. 202010037482.3, filed on Jan. 14, 2020, entitled "Multi-component composite intercalated low-temperature expandable graphite system for deep oil reservoir profile control and water shutoff, preparation method, and use thereof", which is specifically and entirely incorporated by reference.

FIELD

The present disclosure relates to the field of oilfield chemistry, in particular to a composition for multi-component composite intercalation, a method of preparing a graphite system and a method of profile control and water shutoff in an oil reservoir.

BACKGROUND

Deep oil gas resources are important alternative fields of future oil gas resource development. Water injection and gas injection are important measures for the development of deep oil reservoirs, but long-term water injection or gas injection aggravates the heterogeneity of the reservoir, and cross flow is easy to occur, so that the water content of an oil well rises quickly, and the development level is reduced to some extent. The profile control and water shutoff of the ultra-deep oil reservoir is an important technology for improving the development effect of water injection or gas injection, and the plugging agents such as polymer particle gel, inorganic particles, foam and the like developed at present are widely applied to the aspect of profile control and water shutoff. However, ultra-deep oil reservoir faces complex and severe reservoir conditions of ultra-high temperature (more than or equal to 150° C.), ultra-high salinity (more than or equal to 200,000 mg/L) and ultra-high pressure (more than or equal to 50 MPa), a conventional particle gel system is poor in stability and easy to degrade, inorganic particles are difficult to transport deeply, a foam construction process is complex, validity period is short, and the application of a conventional plugging agent system in a deep oil reservoir is limited.

CN103232839B discloses a water shutoff agent suitable for water shutoff and profile control of high-temperature and high-salinity oil reservoirs. The water shutoff agent consists of a main agent, a cross-linking agent, a stabilizing agent and water, wherein the main agent is sulfonated tannin extract or sodium humate; the cross-linking agent is a combination of aldehyde cross-linking agent and phenolic cross-linking agent, and the stabilizing agent is water glass and non-ionic polyacrylamide. It can be suitable for water shutoff and profile control of oil layers with the temperature of 90° C. to 150° C. and the degree of mineralization of more than 2.0 multiplied by $10^5$ mg/L. But the condition of the oil reservoir with the temperature of more than or equal to 150° C. is not involved, and the application of profile control and water shutoff in an ultra-deep oil reservoirs is limited.

CN104927825B discloses a temperature-resistant salinity-resistant dispersed particle gel nitrogen foam composite profile control and flooding system. The system comprises a gas phase and a liquid phase, wherein the gas phase is nitrogen, the liquid phase is a combination of a foaming agent, a foam stabilizer and water, the system can resist the temperature of 130° C., resist the degree of total mineralization of 17 multiplied by $10^4$ mg/L, resist calcium ion of 1.0 multiplied by $10^4$ mg/L and resist magnesium ion of 1.0 multiplied by $10^4$ mg/L. However, the conditions of the oil reservoir with the temperature of more than or equal to 150° C. and the degree of mineralization of more than or equal to 2.0 multiplied by $10^5$ mg/L are not involved, the foam field construction is relatively complex, and it is difficult to meet the requirement of profile control and water shutoff of the ultra-deep oil reservoir.

Therefore, in order to improve the profile control and water shutoff effect of the ultra-deep oil reservoir to the maximum extent, a new plugging agent system needs to be developed, and a multidimensional intercalation low-temperature expandable graphite system capable of meeting the requirements of ' advancing, moving far and plugging' needs to be developed. The initial expansion temperature of the existing expandable graphite is generally higher, generally more than or equal to 300° C., and the complete expansion temperature is between 900° C. and 1000° C. The expansion can not be realized under the condition of the ultra-deep oil reservoir, and the deep profile control and water shutoff of the ultra-deep oil reservoir are difficult to realize.

SUMMARY

The present disclosure aims to provide composition for multi-component composite intercalation, a method of preparing a multi-component composite intercalated low-temperature expandable graphite system and a method of profile control and water shutoff in a deep oil reservoir using the graphite system. The graphite system can expand at 130° C. to 200° C., resist the salinity of 100,000 mg/l to 300,000 mg/l, has the characteristics of high expansion times, long-term stability and the like, and can realize long-term profile control and water shutoff in ultra-deep oil reservoirs.

In order to achieve the above object, one aspect of the present disclosure provides a composition for multi-component composite intercalation, comprising an inorganic acid, an organic acid, and an intercalation reinforcing agent, wherein the intercalation reinforcing agent contains an alkali metal halide and a cationic surfactant.

In a second aspect, the present disclosure provides a method of preparing a graphite system, comprising: carrying out an intercalation process on the graphite using the composition for multi-component composite intercalation described above.

In a third aspect, the present disclosure provides a method of profile control and water shutoff in an oil reservoir using the graphite system produced by the method described above.

Compared with the prior art, the present disclosure has the following advantages:

(1) the multi-component composite intercalated low-temperature expandable graphite system for profile control and water shutoff of deep oil reservoirs of the present disclosure is suitable for profile control and water shutoff of ultra-deep oil reservoirs with reservoir temperatures of 130° C. to 200° C. and salinity of 100,000 mg/l to 300,000 mg/l, it can expand by 3 times to 10 times, and has the characteristics of strong plugging property and good scouring resistance.

(2) The preparation method of the multi-component composite intercalated low-temperature expandable graphite system for profile control and water shutoff of deep oil reservoirs of the present disclosure is simple and easy to operate, can realize low-temperature expansion, has controllable particle size of 10 μm to 180 μm, and overcomes the defects of high initial expansion temperature and uncontrollable particle size of the existing expandable graphite system.

(3) The multi-component composite intercalated low-temperature expandable graphite system for profile control and water shutoff of deep oil reservoirs of the present disclosure has good flexibility, self-lubricity, good compatibility with stratum water and environmental friendliness, and is easy to enter deep parts of the stratum.

(4) The multi-component composite intercalated low-temperature expandable graphite system for profile control and water shutoff of deep oil reservoirs of the present disclosure has the advantages of wide raw material source, low price and simple product preparation, and is suitable for large-scale preparation operation on site.

(5) The multi-component composite intercalated low-temperature expandable graphite system for profile control and water shutoff of deep oil reservoirs of the present disclosure has controllable particle size and good compatibility with stratum permeability, and can meet the requirements of profile control and water shutoff of deep oil reservoirs with different permeabilities.

DETAILED DESCRIPTION

Figure 1:
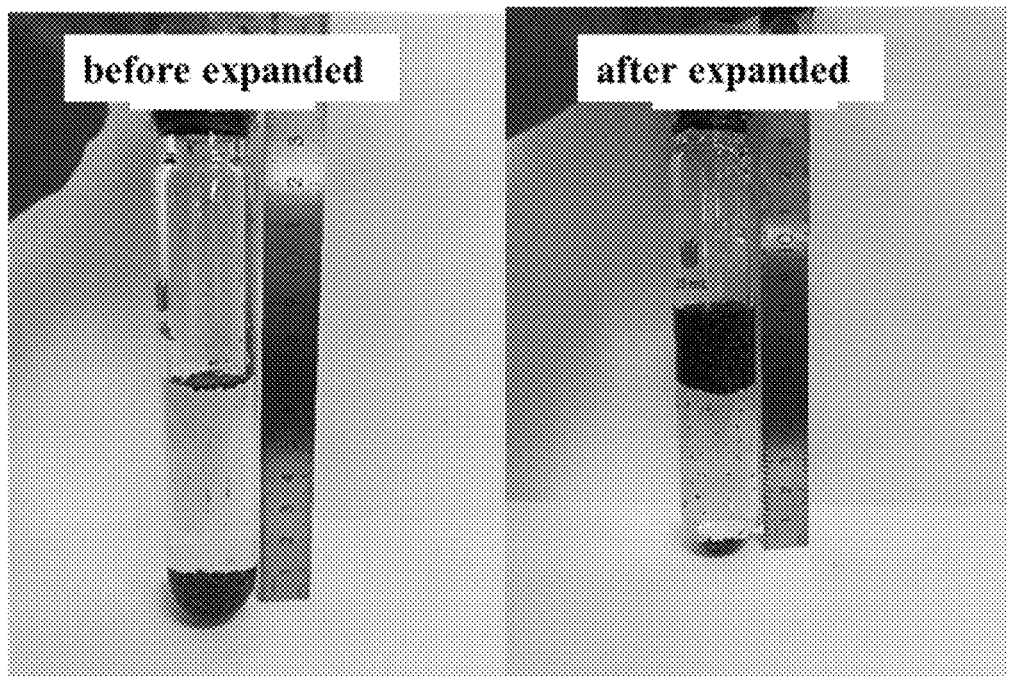
FIG. 1 is a diagram showing the effects of the multi-component intercalated low-temperature expandable graphite system for profile control and water shutoff of a deep oil reservoir in example 1 before and after expansion.

The endpoints of the ranges and any value in the ranges disclosed herein are not limited to the precise ranges or values, and these ranges or values should be understood to encompass values close to these ranges or values. For numerical ranges, each range between its endpoints and individual point values, and each individual point value can be combined with each other to obtain one or more new numerical ranges, and such numerical ranges should be deemed as specifically disclosed herein.

In a first aspect, the present disclosure provides a composition for multi-component composite intercalation, comprising an inorganic acid, an organic acid and an intercalation reinforcing agent, wherein the intercalation reinforcing agent contains an alkali metal halide and a cationic surfactant.

According to the present disclosure, by treating graphite with the composition for multi-component composite intercalation of the present disclosure, the expandable graphite with high expansion rate and high salinity resistance at a lower temperature can be obtained under the synergistic action of inorganic acid, organic acid and intercalation reinforcing agent. In order to obtain better coordination effect and be more suitable for processing graphite to obtain higher water shutoff performance, the weight ratio of the inorganic acid, the organic acid and the intercalation reinforcing agent is preferably 100: (20 to 50): (5 to 25), preferably 100: (25 to 40): (10 to 20).

Wherein the inorganic acid is preferably an inorganic acid having high acid strength and high oxidizing property, and the inorganic acid is preferably one or more of sulfuric acid, nitric acid and perchloric acid, and particularly preferably a combination of sulfuric acid and perchloric acid. In the case of a combination of sulfuric acid and perchloric acid, in order to obtain a synergistic effect with the organic acid and the intercalation reinforcing agent, the weight ratio of sulfuric acid to perchloric acid is preferably from 1:1.5 to 1:5, more preferably 1:1.5 to 1:3. Wherein the sulfuric acid is preferably provided in the form of concentrated sulfuric acid, with a concentration of 97% by weight to 99% by weight, usually 98% by weight, and the perchloric acid is preferably provided in the form of concentrated perchloric acid, with a concentration of 70% by weight to 73% by weight, usually 72% by weight.

Wherein the organic acid can be formic acid and/or acetic acid, and preferably acetic acid. The acetic acid is preferably provided as glacial acetic acid.

According to the present disclosure, the weight ratio of the alkali metal halide to the cationic surfactant in the intercalation reinforcing agent can be varied within wide range, and in order to obtain an intercalation reinforcing agent which has a better synergistic effect with inorganic and organic acids, the weight ratio of the alkali metal halide to the cationic surfactant is preferably from 0.5:1 to 2:1, preferably 0.5:1 to 1:1.

Preferably, the alkali metal halide is sodium chloride and/or sodium bromide, preferably sodium bromide.

Among them, the cationic surfactant preferably employs a $C_8$ to $C_{22}$ alkyl tri ($C_1$ to $C_6$ alkyl) ammonium halide, that is, a long-chain alkyl trialkyl ammonium halide, and thus, in cooperation with an alkali metal halide, the expansion performance of the graphite intercalation structure can be enhanced. More preferably, the cationic surfactant is one or more of decyl trimethyl ammonium chloride, decyl trimethyl ammonium bromide, decyl triethyl ammonium chloride, decyl triethyl ammonium bromide, dodecyl trimethyl ammonium chloride, dodecyl trimethyl ammonium bromide, dodecyl triethyl ammonium chloride, dodecyl triethyl ammonium bromide, tetradecyl trimethyl ammonium chloride, tetradecyl trimethyl ammonium bromide, tetradecyl triethyl ammonium chloride, tetradecyl triethyl ammonium bromide, hexadecyl trimethyl ammonium chloride, hexadecyl trimethyl ammonium bromide, hexadecyl triethyl ammonium chloride, hexadecyl triethyl ammonium bromide, octadecyl trimethyl ammonium chloride, octadecyl trimethyl ammonium bromide, octadecyl triethyl ammonium chloride, and octadecyl triethyl ammonium bromide, more preferably dodecyl trimethyl ammonium chloride, dodecyl trimethyl ammonium bromide, dodecyl triethyl ammonium chloride, dodecyl triethyl ammonium bromide, hexadecyl trimethyl ammonium chloride, hexadecyl trimethyl ammonium bromide, hexadecyl triethyl ammonium chloride and hexadecyl triethyl ammonium bromide.

In a preferred embodiment of the present disclosure, the composition for multi-component composite intercalation is composed of an inorganic acid, an organic acid and an intercalation reinforcing agent, the inorganic acid being a combination of sulfuric acid and perchloric acid, the organic acid being acetic acid, and the intercalation reinforcing agent being a combination of an alkali metal halide and a cationic surfactant, the cationic surfactant being one or more of dodecyl trimethyl ammonium chloride (e.g., n-dodecyl trimethyl ammonium chloride), dodecyl trimethyl ammonium bromide (e.g., n-dodecyl trimethyl ammonium bromide), dodecyl triethyl ammonium chloride (e.g., n-dodecyl triethyl ammonium chloride), dodecyl triethyl ammonium bromide (e.g., n-dodecyl triethyl ammonium bromide), hexadecyl trimethyl ammonium chloride (e.g., n-hexadecyl trimethyl ammonium chloride), hexadecyl trimethyl ammonium bromide (e.g., n-hexadecyl trimethyl ammonium bromide), hexadecyl triethyl ammonium chloride (e.g., n-hexadecyl triethyl ammonium chloride) and hexadecyl triethyl ammonium bromide (e.g., n-hexadecyl triethyl ammonium bromide), the alkali metal halide being sodium bromide. Using the composition, graphite for water shutoff agent with more excellent low-temperature expansibility can be obtained.

In a second aspect, the present disclosure provides a method of preparing a graphite system, comprising: carrying out an intercalation process on the natural flake graphite using the composition for multi-component composite intercalation described above.

According to the present disclosure, carrying out an intercalation process on the natural flake graphite using the composition for multi-component composite intercalation described above may enable the graphite to have better expansion performance and the like, and particularly, under the condition of the oil reservoir temperature of 130° C. to 200° C., the expansion effect can be 3 times to 10 times, so that the low-temperature expandable graphite system is provided. In order to obtain a low-temperature expandable graphite system with better water shutoff performance, the amount of the composition for multi-component composite intercalation in terms of inorganic acid is preferably 300 parts by weight to 600 parts by weight, for example 300 parts by weight to 400 parts by weight, with respect to 100 parts by weight of graphite. Wherein the graphite is preferably natural flake graphite, in particular 100 μm to 180 μm particle size.

Although the natural flake graphite is treated by the above-mentioned composition for multi-component composite intercalation of the present disclosure, a graphite system for water shutoff with relatively objective expansibility can be obtained, in order to obtain better treatment effect, preferably, the intercalation process includes a first intercalation process and a second intercalation process, the first intercalation process includes a contact reaction of an organic acid and an inorganic acid with the graphite; the second intercalation process includes a contact reaction of the intercalation reinforcing agent and the product of the first intercalation process. Using the organic acid and the inorganic acid to react with the natural flake graphite firstly, the graphite lamellar structure can be better opened, so that the intercalation reinforcing agent can enter the graphite lamellar structure in the follow-up process, and the improvement of the expansion performance is facilitated.

In the present disclosure, preferably, the conditions of the first intercalation process include: a temperature of 30° C. to 60° C., and a time of 60 min to 300 min. More preferably, the conditions of the first intercalation process include: a temperature of 30° C. to 50° C., and a time of 100 min to 200 min.

In the present disclosure, preferably, the conditions of the second intercalation process include: a temperature of 30° C. to 60° C., and a time of 3 h to 8 h. More preferably, the conditions of the second intercalation process include: a temperature of 30° C. to 50° C. and a time of 4 h to 6 h.

Wherein the intercalation reinforcing agent may be provided in the form of an aqueous solution, preferably in an amount such that the intercalation reinforcing agent is present in an amount of from 5% by weight to 10% by weight.

More preferably, the first intercalation process includes a contact reaction of natural flake graphite with an inorganic acid, followed by introduction of an organic acid, so that the graphite can be treated with inorganic acid to facilitate intercalation of organic acid. In this case, preferably, the first intercalation process includes a contact reaction of an inorganic acid with graphite for 30 min to 120 min at 30° C. to 60° C., followed by introduction of an organic acid to continue the reaction for 10 min to 100 min at 30° C. to 60° C. More preferably, the first intercalation process comprises a contact reaction of an inorganic acid with graphite for 60 min to 100 min at 30° C. to 50° C., followed by introduction of an organic acid to continue the reaction for 20 min to 50 min at 30° C. to 50° C.

According to the present disclosure, the method may comprise, after the organic acid intercalation process, subjecting the resultant product to water washing and dehydration treatment, subjecting the resultant dried graphite particles to a second intercalation process with the intercalation reinforcing agent, and subjecting the resultant product of the second intercalation process to water washing and dehydration treatment to obtain a dried intercalated graphite product.

According to the present disclosure, in order to facilitate the intercalation of the inorganic acid, preferably, the method comprises: before the intercalation process, carrying out pre-oxidation process on the natural flake graphite using an oxidant.

Wherein the amount of the oxidant and the natural flake graphite can be varied within a wide range, and preferably, the weight ratio of the oxidant to the natural flake graphite is 1:1 to 5:1, preferably 1.5:1 to 3.5:1.

According to the present disclosure, the oxidant may be one or more of nitric acid, potassium permanganate, sodium nitrate and hydrogen peroxide, preferably a combination of nitric acid and potassium permanganate. More preferably, the weight ratio of nitric acid to potassium permanganate is 20:1 to 60:1, preferably 25:1 to 45:1. Among these, the nitric acid is preferably provided in the form of concentrated nitric acid, with a concentration of 65% by weight to 68% by weight, typically 67% by weight.

According to the present disclosure, preferably, the conditions of the pre-oxidation process include: a temperature of 25° C. to 40° C., and a time of 30 min to 60 min. More preferably, the conditions of the pre-oxidation process include: a temperature of 30° C. to 40° C., and a time of 40 min to 50 min.

According to the present disclosure, the pre-oxidation process may be performed under the action of ultrasound, and the conditions of the ultrasound are not particularly limited as long as the contact reaction of graphite and an oxidant is facilitated.

According to the present disclosure, the inorganic acid or the inorganic acid and the organic acid or the composition for multi-component composite intercalation can be directly introduced into the pre-oxidation treated product without separating the product of the pre-oxidation process, and the pre-oxidation treated graphite is subjected to intercalation process.

According to the present disclosure, in order to obtain a multi-component intercalated low-temperature expandable graphite system for profile control and water shutoff of deep oil reservoirs with controllable particle size, preferably, the method comprises: shearing the intercalated product, so that the particle size of the graphite is 10 μm to 180 μm, preferably 10 μm to 80 μm. The conditions of the shearing process may include: adopting a colloid mill, adjusting parameters to be 5 to 50 Hz, adjusting the outlet of the fan to be 0.5 to 5, and circularly shearing for 1 min to 5 min.

In a preferred embodiment of the present disclosure, the method of preparing the low-temperature expandable graphite system comprises:

(1) carrying out pre-oxidation process on natural flake graphite using an oxidant;

(2) carrying out a contact reaction of the pre-oxidation treated natural flake graphite with inorganic acid, and followed by introducing organic acid for contact reaction;

(3) carrying out contact reaction of the natural flake graphite treated by the organic acid with an intercalation reinforcing agent; and (4) shearing the product obtained in the step (3).

The multi-component composite intercalated low-temperature expandable graphite system of the present disclosure is prepared by the method described above.

The multi-component composite intercalated low-temperature expandable graphite system of the present disclosure has the characteristics of low-temperature expansibility, higher expansion times, good salinity resistance, strong plugging property and good scouring resistance.

The multi-component composite intercalated low-temperature expandable graphite system of the present disclosure can be used as a profile control and water shutoff agent in an oil reservoir.

In a third aspect, the present disclosure provides a method of profile control and water shutoff in an oil reservoir using the graphite system produced by the method described above.

The multi-component composite intercalated low-temperature expandable graphite system for profile control and water shutoff of deep oil reservoirs is suitable for profile control and water shutoff of ultra-deep oil reservoirs with reservoir temperatures of 130° C. to 200° C. and salinity of 100,000 mg/l to 300,000 mg/l, can expand by 3 times to 10 times, and has the characteristics of strong plugging property and good scouring resistance.

The present disclosure will be described in detail below by way of examples.

Example 1

This example is provided to describe the low-temperature expandable graphite system of the present disclosure and method of making the same.

(1) 300 parts by weight of a nitric acid solution of potassium permanganate (the weight ratio of potassium permanganate to nitric acid is 1:30; nitric acid is 67% by weight of concentrated nitric acid) and 100 parts by weight of natural flake graphite particles (natural flake graphite particles with a particle size of 150 μm, purchased from Qingdao graphite GmbH) are stirred and mixed, and are placed under 30° C. for ultrasonic reaction for 45 minutes, so that a pre-oxidized graphite system is obtained.

(2) Adding 400 parts by weight of inorganic acid (the weight ratio of concentrated sulfuric acid to perchloric acid is 1:3; the concentration of the concentrated sulfuric acid is 98% by weight, and the concentration of the perchloric acid is 72% by weight) into a pre-oxidized graphite system, and stirring and reacting for 80 minutes at 30° C. to obtain an inorganic intercalation oxidized graphite system; then adding 150 parts by weight of glacial acetic acid, and stirring and reacting for 30 minutes at 30° C.; washing the resultant product with deionized water until the pH value is 6, carrying out suction filtration and dehydration, and drying in an oven at 50° C. for 36 hours;

(3) Adding the product dried in the step (2) into an aqueous solution of intercalation reinforcing agent (the content of n-hexadecyl trimethyl ammonium bromide is 3 parts by weight, the content of potassium bromide is 2 parts by weight, and the content of water is 100 parts by weight), stirring for 30 minutes at 30° C., standing for 3 hours, then washing with deionized water, carrying out suction filtration and dehydration, and drying in an oven at 50° C. for 36 hours.

(4) Placing the product dried in the step (3) in a colloid mill, adjusting the parameters to be 50 Hz and the outlet of the fan to be 0.5, and circularly shearing for 5 minutes to obtain a multi-component composite intercalated low-temperature expandable graphite system G1-1 with an average particle size of 10 μm.

Example 2

This example is provided to describe the low-temperature expandable graphite system of the present disclosure and method of making the same.

The process of example 1 is followed, except that, the shearing conditions in step (4) include: the parameters of the colloid mill of 40 Hz and the outlet of the fan of 1.0, and circularly shearing for 3 minutes, to obtain a multi-component composite intercalated low-temperature expandable graphite system G1-2 with an average particle size of 40 μm.

Example 3

This example is provided to describe the low-temperature expandable graphite system of the present disclosure and method of making the same.

The process of example 1 is followed, except that, the shearing conditions in step (4) include: the parameters of the colloid mill of 30 Hz and the outlet of the fan of 1.5, and circularly shearing for 2 minutes, to obtain a multi-component composite intercalated low-temperature expandable graphite system G1-3 with an average particle size of 60 μm.

Example 4

This example is provided to describe the low-temperature expandable graphite system of the present disclosure and method of making the same.

(1) 230 parts by weight of a nitric acid solution of potassium permanganate (the weight ratio of potassium permanganate to nitric acid is 1:25; nitric acid is 67% by weight of concentrated nitric acid) and 100 parts by weight of natural flake graphite particles (natural flake graphite particles with a particle size of 100 μm, which are purchased from Qingdao graphite GmbH) are stirred and mixed, and are placed under 40° C. for ultrasonic reaction for 60 minutes, so that a pre-oxidized graphite system is obtained.

(2) Adding 308 parts by weight of inorganic acid (the weight ratio of concentrated sulfuric acid to perchloric acid is 1:4; the concentration of the concentrated sulfuric acid is 98% by weight, and the concentration of the perchloric acid is 72% by weight) into a pre-oxidized graphite system, and stirring and reacting for 80 minutes at 40° C. to obtain an inorganic intercalation oxidized graphite system; then adding 78 parts by weight of glacial acetic acid, and stirring and reacting for 40 minutes at 40° C.; washing the resultant product with deionized water until the pH value is 7, carrying out suction filtration and dehydration, and drying in an oven at 50° C. for 36 hours;

(3) Adding the product dried in the step (2) into an aqueous solution of intercalation reinforcing agent (the content of n-dodecyl trimethyl ammonium bromide is 2.3 parts by weight, the content of potassium bromide is 3.1 parts by weight, and the content of water is 100 parts by weight), stirring at 40° C. for 40 minutes, standing for 5 hours, then washing with deionized water, carrying out suction filtration and dehydration, and drying in an oven at 50° C. for 36 hours.

(4) Placing the product dried in the step (3) in a colloid mill, adjusting the parameters to be 10 Hz and the outlet of the fan to be 2.0, and circularly shearing for 1 minutes to obtain a multi-component composite intercalated low-temperature expandable graphite system G1-4 with an average particle size of 80 µm.

Example 5

This example is provided to describe the low-temperature expandable graphite system of the present disclosure and method of making the same.

According to the method of example 4, except that, the shearing conditions in step (4) include: the parameters of the colloid mill of 40 Hz and the outlet of the fan of 1.0, and circularly shearing for 4 minutes, to obtain a multi-component composite intercalated low-temperature expandable graphite system G1-5 with an average particle size of 30 µm.

Example 6

This example is provided to describe the low-temperature expandable graphite system of the present disclosure and method of making the same.

The process of example 1 is followed, except that, in step (2), a mode of simultaneously intercalating organic acid and inorganic acid is adopted, the specific step (2) is as follows:

adding 400 parts by weight of inorganic acid (the weight ratio of concentrated sulfuric acid to perchloric acid is 1:3; the concentration of the concentrated sulfuric acid is 98% by weight; and the concentration of the perchloric acid is 72% by weight) and 150 parts by weight of glacial acetic acid into a pre-oxidized graphite system, stirring and reacting for 110 minutes at 30° C., washing the resultant product with deionized water until the pH value is 6, carrying out suction filtration and dehydration, and drying in an oven at 50° C. for 36 hours;

An expandable graphite system G1-6 with an average particle size of 10 µm was obtained.

Example 7

This example is provided to describe the low-temperature expandable graphite system of the present disclosure and method of making the same.

The process of example 1 is followed, except that, steps (2) and (3) are carried out simultaneously, i.e. step (1) is followed by the following steps:

adding 400 parts by weight of inorganic acid (the weight ratio of concentrated sulfuric acid to perchloric acid is 1:3; the concentration of concentrated sulfuric acid is 98% by weight; and the concentration of perchloric acid is 72% by weight), 150 parts by weight of glacial acetic acid and an aqueous solution of intercalation reinforcing agent (the content of n-hexadecyl trimethyl ammonium bromide is 3 parts by weight, the content of potassium bromide is 2 parts by weight, and the content of water is 100 parts by weight) into a pre-oxidized graphite system, stirring and reacting for 120 minutes at 30° C., then standing for 3 hours, washing the resultant product with deionized water until the pH value is 6, carrying out suction filtration and dehydration, and drying in an oven at 50° C. for 36 hours;

An expandable graphite system G1-7 with an average particle size of 10 µm was obtained.

Example 8

This example is provided to describe the low-temperature expandable graphite system of the present disclosure and method of making the same.

The process of example 1 is followed, except that, the pre-oxidation process of step (1) is not performed, 100 parts by weight of the natural flake graphite particles are directly used for the intercalation process in step (2).

An expandable graphite system G1-8 with an average particle size of 10 µm was obtained.

Example 9

This example is provided to describe the low-temperature expandable graphite system of the present disclosure and method of making the same.

The process of example 1 is followed, except that, in step (2), equal parts by weight of concentrated sulfuric acid are used in place of perchloric acid, i.e. concentrated sulfuric acid is used as the inorganic acid. The specific step (2) is as follows:

adding 400 parts by weight of inorganic acid (concentrated sulfuric acid) into a pre-oxidized graphite system, and stirring and reacting for 80 minutes at 30° C. to obtain an inorganic intercalation oxidized graphite system; then adding 150 parts by weight of glacial acetic acid, and stirring and reacting for 30 minutes at 30° C.; washing the resultant product with deionized water until the pH value is 6, carrying out suction filtration and dehydration, and drying in an oven at 50° C. for 36 hours;

A multi-component composite intercalated low-temperature expandable graphite system G1-9 with an average particle size of 10 µm was finally obtained.

Example 10

This example is provided to describe the low-temperature expandable graphite system of the present disclosure and method of making the same.

The process of example 1 is followed, except that, in step (2), equal parts by weight of perchloric acid are used in place of concentrated sulfuric acid, i.e. perchloric acid is used as the inorganic acid. The specific step (2) is as follows:

adding 400 parts by weight of inorganic acid (perchloric acid) into a pre-oxidized graphite system, and stirring and reacting for 80 minutes at 30° C. to obtain an inorganic intercalation oxidized graphite system; then adding 150 parts by weight of glacial acetic acid, and stirring and reacting for 30 minutes at 30° C.; washing the resultant product with deionized water until the pH value is 6, carrying out suction filtration and dehydration, and drying in an oven at 50° C. for 36 hours;

A multi-component composite intercalated low-temperature expandable graphite system G1-10 with an average particle size of 10 µm was finally obtained.

Example 11

This example is provided to describe the low-temperature expandable graphite system of the present disclosure and method of making the same.

The process of example 1 is followed, except that, in step (2), equal part by weight of formic acid are used in place of glacial acetic acid, i.e. formic acid is used as the organic acid. The specific step (2) is as follows:

adding 400 parts by weight of inorganic acid (the weight ratio of concentrated sulfuric acid to perchloric acid is 1:3; the concentration of the concentrated sulfuric acid is 98% by weight, and the concentration of the perchloric acid is 72% by weight) into a pre-oxidized graphite system, and stirring and reacting for 80 minutes at 30° C. to obtain an inorganic intercalation oxidized graphite system; then adding 150 parts by weight of formic acid, and stirring and reacting for 30 minutes at 30° C.; washing the resultant product with deionized water until the pH value is 6, carrying out suction filtration and dehydration, and drying in an oven at 50° C. for 36 hours;

A multi-component composite intercalated low-temperature expandable graphite system G1-11 with an average particle size of 10 μm was finally obtained.

Comparative Example 1

(1) Mixing 300 parts by weight of a nitric acid solution of potassium permanganate (the weight ratio of potassium permanganate to nitric acid is of 1:30; nitric acid is 67% by weight concentrated nitric acid), 400 parts by weight of an inorganic acid (the weight ratio of concentrated sulfuric acid to perchloric acid is 1:3; the concentration of the concentrated sulfuric acid is 98% by weight; and the concentration of the perchloric acid is 72% by weight) and 150 parts by weight of glacial acetic acid, then adding 100 parts by weight of natural flake graphite particles (natural flake graphite particles with a particle size of 100 μm, purchased from Qingdao graphite GmbH) and stirring and mixing, and reacting for 60 minutes at 30° C.; washing the resultant product with deionized water until the pH value is 6, carrying out suction filtration and dehydration, and drying in an oven at 50° C. for 36 hours.

(2) Placing the product dried in the step (1) in a colloid mill, adjusting parameters to be 50 Hz and the outlet of the fan to be 0.5, and circularly shearing for 5 minutes to obtain a multi-component composite intercalated low-temperature expandable graphite system DG1-1 with an average particle size of 10 μm.

Comparative Example 2

The process of comparative example 1 is followed, except that, the shearing conditions in step (2) include: the parameters of the colloid mill of 40 Hz, the outlet of the fan of 1.0, and circularly shearing for 3 minutes to obtain a multi-component composite intercalated low-temperature expandable graphite system DG1-2 with an average particle size of 40 μm.

Comparative Example 3

Commercially available natural flake graphite particles (natural flake graphite particles with a particle size of 150 μm, purchased from Qingdao graphite GmbH) were placed in a colloid mill, the parameters were adjusted to 50 Hz, the outlet of the fan was adjusted to 0.5, and circularly shearing for 5 minutes to obtain a natural natural flake graphite particles DG1-3 with an average particle size of 10 μm.

Test Example 1

Figure 2:
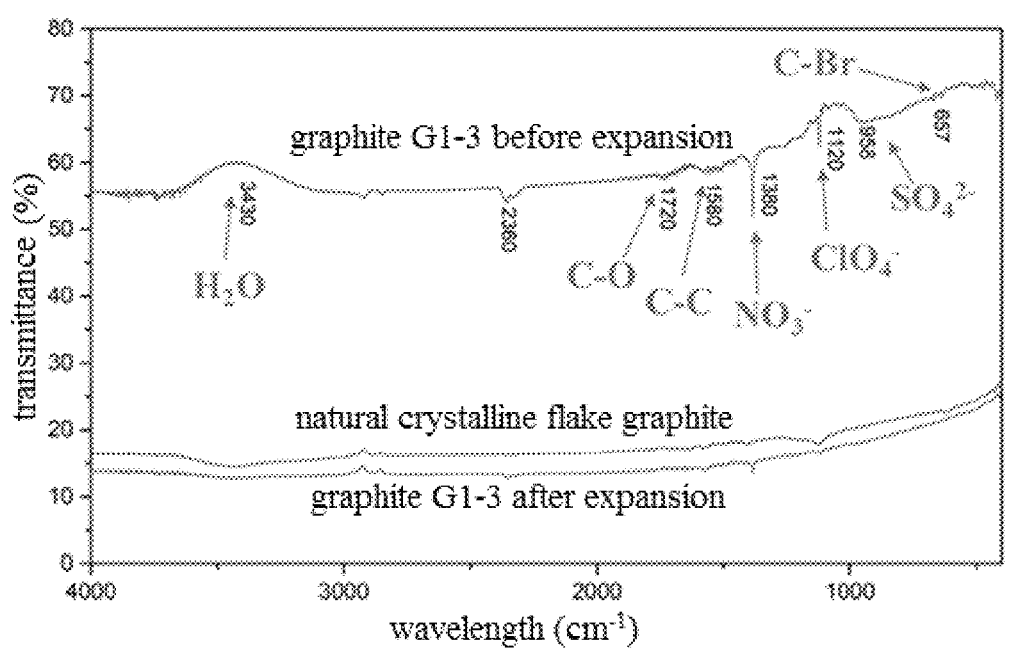
FIG. 2 is a Fourier infrared curve of the natural flake graphite and the multi-component intercalated low-temperature expandable graphite system for profile control and water shutoff of deep oil reservoirs in example 3 before and after expansion.

The above intercalated graphite system and the natural flake graphite particles (as a control group) of comparative example 3 without intercalation process are aged for 5 days at different temperatures in stratum simulation water with the mineralization degree of 100,000 mg/L (sodium ion of 35769 mg/L, calcium ion of 1000 mg/L and magnesium ion of 1000 mg/L), the expansion capacity is observed, and the expansion degree is calculated, and the results are shown in the following table; wherein a graph comparing the expansion of G1-1 obtained in example 1 before and after aging at 130° C. for 5 days is shown in FIG. 1; the Fourier infrared plot of the G1-3 obtained in example 3 before and after expansion and the natural flake graphite is shown in FIG. 2.

The degree of expansion is the volume of graphite after 5 days of aging/the volume of graphite before aging.

TABLE 1

| Graphite system | Degree of expansion (times) | | |
|---|---|---|---|
| Test temperature | 130° C. | 150° C. | 200° C. |
| G1-1 | 3 | 6 | 10 |
| G1-2 | 3.8 | 7.2 | 11 |
| G1-3 | 4.0 | 8.1 | 11.9 |
| G1-4 | 4.5 | 9.7 | 15.4 |
| G1-5 | 3.6 | 7.0 | 10.4 |
| G1-6 | 2.1 | 4.6 | 6.8 |
| G1-7 | 1.9 | 3.2 | 6.0 |
| G1-8 | 1.6 | 3.0 | 5.5 |
| G1-9 | 1.2 | 2.5 | 4 |
| G1-10 | 1.2 | 2.4 | 3.6 |
| G1-11 | 1.8 | 3.4 | 5.9 |
| DG1-1 | 1 | 1.1 | 1.4 |
| DG1-2 | 1 | 1.3 | 1.6 |
| DG1-3 | 1 | 1 | 1 |

It can be seen from the above table that the multi-component composite intercalated low-temperature expandable graphite system for profile control and water shutoff of the deep oil reservoir has high expansion performance in a high salinity system at the temperature of 130° C. to 200° C., and is suitable for profile control and water shutoff of the ultra-deep oil reservoir at the reservoir temperature of 130° C. to 200° C. and the salinity of 100,000 mg/L to 300,000 mg/L.

Test Example 2

Testing the plugging capability of the rock core: basic parameters of the core: length×diameter=20 cm×2.5 cm (permeability is seen from table below); the plugging rate test adopts that a sand-packed pipe of saturated oil is water flooded to 80%, the oil production, the water production and the pressure change are recorded, then 0.5% by weight of water dispersion of the above-mentioned intercalated graphite system, which is 0.5 times of the pore volume, is injected into the sand-packed pipe, the aging is carried out for 5 days at different temperatures, then the subsequent water-flooding is carried out, the oil production, the water production and the pressure change in the process are recorded, and the plugging rate is calculated. The results are shown in Table 2.

TABLE 2

| Graphite system | Plugging rate Test temperature | | |
|---|---|---|---|
| | 130° C. | 150° C. | 200° C. |
| Permeability | | 1.64 μm$^2$ | |
| G1-1 | 56.5% | 72.8% | 85.5% |
| G1-2 | 57.2% | 76.9% | 86.8% |
| G1-3 | 58.1% | 76.6% | 88.2% |
| G1-4 | 59.2% | 76.3% | 84.2% |
| G1-5 | 54.3% | 75.9% | 85.0% |
| G1-6 | 26.3% | 43.8% | 65.5% |
| G1-7 | 25.2% | 41.6% | 63.9% |
| G1-8 | 22.3% | 39.4% | 58.2% |
| G1-9 | 20.8% | 36.7% | 50.4% |
| G1-10 | 24.0% | 40.3% | 50.2% |
| G1-11 | 25.8% | 44.5% | 60.9% |
| DG1-1 | 20.5% | 30.6% | 43.4% |
| Permeability | | 0.65 μm$^2$ | |
| G1-2 | 68.7% | 81.4% | 89.6% |
| G1-4 | 76.2% | 84.3% | 90.6% |
| DG1-2 | 25.4% | 37.8% | 44.6% |
| Permeability | | 0.45 μm$^2$ | |
| G1-3 | 72.5% | 83.6% | 91.7% |

It can be seen from the above table that the multi-component composite intercalated low-temperature expandable graphite system for profile control and water shutoff of the deep oil reservoir has a good plugging effect.

While the present disclosure has been described above in detail in some preferred embodiments, the present disclosure is not limited thereto. Various simple variations, including combinations of the technical features in any other appropriate way, can be made to the technical scheme of the present disclosure within the scope of the technical concept of the present disclosure, but such variations and combinations shall be deemed as disclosed content in the present disclosure and falling in the protection scope of the present disclosure.

The invention claimed is:

1. A composition for multi-component composite intercalation, comprising an inorganic acid, an organic acid and an intercalation reinforcing agent,
wherein the intercalation reinforcing agent contains an alkali metal halide and a cationic surfactant.

2. The composition for multi-component composite intercalation of claim 1, wherein the weight ratio of the alkali metal halide to the cationic surfactant in the intercalation reinforcing agent is from 0.5:1 to 2:1.

3. The composition for multi-component composite intercalation of claim 1, wherein the alkali metal halide is sodium chloride and/or sodium bromide.

4. The composition for multi-component composite intercalation of claim 1, wherein the cationic surfactant is a $C_8$ to $C_{22}$ alkyl tri ($C_1$ to $C_6$ alkyl) ammonium halide.

5. The composition for multi-component composite intercalation of claim 1, wherein the inorganic acid is one or more of sulfuric acid, nitric acid and perchloric acid.

6. The composition for multi-component composite intercalation of claim 1, wherein the inorganic acid is a combination of sulfuric acid and perchloric acid.

7. The composition for multi-component composite intercalation of claim 1, wherein the organic acid is formic acid and/or acetic acid.

8. The composition for multi-component composite intercalation of claim 1, wherein the weight ratio of the inorganic acid, the organic acid and the intercalation reinforcing agent is 100: (20 to 50): (5 to 25).

9. A method of preparing a graphite system, comprising: carrying out an intercalation process on the natural flake graphite using the composition for multi-component composite intercalation of claim 1.

10. The method of claim 9, wherein with respect to 100 parts by weight of natural flake graphite, the amount of the composition for multi-component composite intercalation in terms of inorganic acid is 300 parts by weight to 600 parts by weight.

11. The method of claim 9, wherein the intercalation process comprises a first intercalation process and a second intercalation process,
the first intercalation process comprises a contact reaction of an organic acid and an inorganic acid with graphite;
the second intercalation process comprises a contact reaction of an intercalation reinforcing agent with the product of the first intercalation process.

12. The method of claim 11, wherein the conditions of the first intercalation process include: a temperature of 30° C. to 60° C., and a time of 60 min to 300 min.

13. The method of claim 11, wherein the conditions of the second intercalation process include: a temperature of 30° C. to 60° C., and a time of 3 h to 8 h.

14. The process of claim 11, wherein the first intercalation process includes a contact reaction of graphite with an inorganic acid, followed by introduction of an organic acid.

15. The method of claim 9, wherein the method further comprises: before the intercalation process, carrying out pre-oxidation process on the graphite using an oxidant.

16. The method of claim 15, wherein the weight ratio of the oxidant and natural flake graphite is from 1:1 to 5:1.

17. The method of claim 15, wherein the oxidant is a combination of nitric acid and potassium permanganate.

18. The method of claim 15, wherein the conditions of the pre-oxidation process include: a temperature of 25° C. to 40° C., and a time of 30 min to 60 min.

19. The method of claim 9, further comprising: shearing the intercalated product, so that the particle size of graphite is from 10 μm to 180 μm.

20. A method of profile control and water shutoff in an oil reservoir using the graphite system produced by the method of claim 9.

* * * * *